J. B. VAN DYNE.
Fire-Extinguishers.
No. 6,132.
Reissued Nov. 10, 1874.
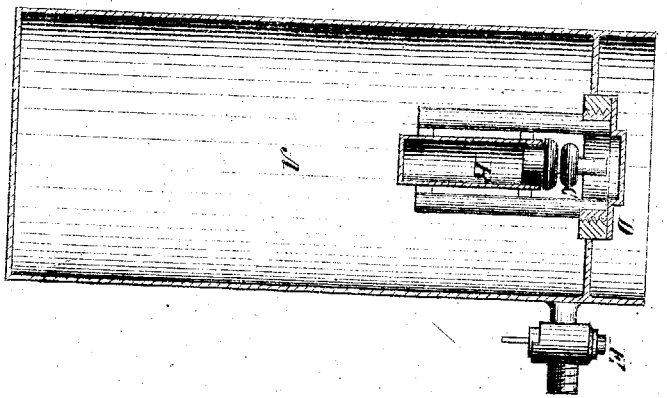
WITNESSES:
G. Moeller
L. A. Pettit
INVENTOR:
J. B. Van Dyne
BY
Munn & Co
ATTORNEYS.

BEST AVAILABLE COPY

UNITED STATES PATENT OFFICE.

JACOB B. VAN DYNE, OF LOUISVILLE, KENTUCKY, ASSIGNOR TO THE CHAMPION FIRE-EXTINGUISHER COMPANY, OF SAME PLACE.

IMPROVEMENT IN FIRE-EXTINGUISHERS.

Specification forming part of Letters Patent No. 125,634, dated April 9, 1872; reissue No. 6,132, dated November 10, 1874; application filed August 3, 1874.

*To all whom it may concern:*

Be it known that I, JACOB B. VAN DYNE, of Louisville, in the county of Jefferson and State of Kentucky, have invented a new and useful Improvement in Fire-Extinguishers; and I do hereby declare that the following is a full, clear, and exact description of the same, reference being had to the accompanying drawing, forming a part of this specification.

The invention will first be fully described, and then clearly pointed out in the claim.

The drawing is a vertical and sectional elevation of the extinguisher, exhibiting the relation of all the parts.

A represents the reservoir, in which is placed four ounces of bicarbonate of soda to each gallon of water. B is the acid-chamber, formed of glass, preferably, and in which is placed a fluid ounce of vitriol to each gallon of water in the reservoir. C is a weighted plug, preferably made of lead, and fitted nicely to the aperture in top of chamber B. D is a screw-cap, to which the acid-chamber B is attached, and from which it is pendent in the reservoir. E is the cock and pipe connection between the reservoir and nozzle or tube, through which the stream is ejected upon the fire.

From experience it has been discovered that the bicarbonate of soda in solution with the water in the reservoirs precipitates itself when the machine is allowed to remain standing for a few days, and becomes condensed upon the bottom of the reservoir.

If these machines are discharged by means of an outside rod or piston connecting with the acid-chamber, this liberation of the acid in the solution of bicarbonate of soda does not cause a chemical union with the large quantity precipitated in the bottom of the reservoir.

My machine is operated as follows: The reservoir A being charged with the solution as above proportioned, and the acid-chamber being screwed into its place, I have a hermetically-sealed chamber, with no outside connection for the mixing of the two chemicals. The mixture of the two chemicals thus arranged can never occur until the machine is completely inverted, which act being done, the stopper drops out from acid-bottle, and the condensed mass of bicarbonate of soda in the bottom of the reservoir is broken up, and a complete and perfect chemical action is created with the entire quantity of both soda and vitriol. Thus my machine operates automatically, and by the simple act of inversion.

I am aware that other fire-extinguishers are in public use wherein a hand-valve of the acid-chamber is raised by a stem which is extended to the top, and operated by manipulating its handle on the outside. My device, on the other hand, operates automatically, and by simple inversion.

The rods to these old valves are packed tightly in the cap, to prevent the gas from blowing out around them and losing the expansible force, which is necessary to throw out the stream. Hence, they can only be unseated by muscular power applied by a pull upon the outside of valve-stem. If this packing once becomes disordered, they cease to work properly or satisfactorily.

Both these difficulties are overcome by my devices, since I dispense altogether with the valve-stem and its packing, and rely entirely upon the gravity of my leaden plug.

Again, the old valve-stemmed extinguishers, when primed and set away ready for emergencies, are liable to be put under pressure through the withdrawal of stem by children or servants. This unpleasant consequence is also prevented by my device, since they would never attempt to turn the reservoir upside down.

I am also aware of a patent which has a sieve near top to receive a dry ingredient; but, in the jostle of running or handling, the ingredients are liable to become mixed too soon.

Mine being provided with the independent glass vessel, and that fitted with a weighted plug, the ingredients can never mix except by a complete inversion.

Having thus described my invention, what I claim as new is—

In chemical fire-extinguishers, a loose plug, C, operated by its own gravity to form a tight stopper to the acid-chamber until inverted, and then dropping out, as and for the purpose specified.

The above specification of my invention signed by me this 22d day of July, 1874.

J. B. VAN DYNE.

Witnesses:
CHAS. A. PETTIT,
SOLON C. KEMON.